Patented July 10, 1945

2,379,986

UNITED STATES PATENT OFFICE 2,379,986

TALL OIL COMPONENTS SEPARATION

Emil Ott, Wilmington, Del., assignor to Hercules Powder Company, Wilmington, Del., a corporation of Delaware No Drawing. Application April 29, 1942,
Serial No. 440,977

3 Claims. (Cl. 260—97.5)

This invention relates to a method of separating the fatty and resin acid components of tall oil and, more particularly, to the formation of nitrogen containing resin acid salts insoluble in the reaction mixture.

In accordance with this invention, separation of the fatty and resin acid components of tall oil is effected by means of a precipitation process, which process effects a more complete separation of the tall oil components than is realized by the prior art distillation and selective solvent extraction methods. Generally, the tall oil is treated with any suitable ketone and then the ketone solution of tall oil is treated with ammonia. Where acetone is used as the solvent and treatment made with ammonia, a precipitate of diacetoneamine abietate and diacetoneamine salts of other resin acids is separated from solution. Separation of the fatty and resin acid salts is then effected in any suitable manner as by means of decantation or filtration. Generally, these insoluble salts may be described as having the resin acid radical connected through a nitrogen atom to a carbonyl containing radical.

The salt derivatives of the fatty and resin acid components of tall oil are easily separated because of the relative solubility of these derivatives in the reaction mixture.

Specifically, tall oil component separation may be made by treating an acetone solution of tall oil with ammonia at a temperature of from 40 to 45° C. for a period of about 2 hours. After precipitation of the insoluble diacetoneamine abietate at a reduced temperature, the acetone solution of the fatty acid salts is removed in any suitable manner as by means of filtration from the resin salt. Suitable treatment such as heating of the filtrate and precipitate yields the fatty and resin acids respectively.

The method in accordance with this invention is illustrated by the following specific examples.

Crude tall oil having the following analysis was used in each of the following examples:

| | |
|---|---|
| Acid number | 161 |
| Saponification number | 170 |
| Gasoline-insoluble per cent | 0.6 |
| Petroleum ether-insoluble do | 1.5 |
| Refractive index | 1.5025 |
| Thiocyanate number | 101 |
| Unsaponifiable per cent | 13.1 |
| Resin acid (as abietic) do | 33.3 |
| Fatty acid (by difference) do | 53.6 |

EXAMPLE 1

Acetone-ammonia treatment 500 g. of crude tall oil having a dark brown color was added to 1500 cc. of acetone and mixed to form a complete solution. This solution was treated with a rapid stream of ammonia for 3 hours during agitation of the mixture. The temperature of the solution rose slowly at first and then more rapidly until finally cooling with ice water held the temperature down to 40-45° C. Suspended material appeared in the solution at the end of about ¾ of an hour of treatment with ammonia and increased during further treatment. After standing, the mixture was filtered with suction. The residue on the filter was washed with acetone and dried in an oven at 60° C. for 2 hours to obtain 230 g. of a powdery buff-colored material. The filtrate was evaporated in a distilling flask in an oil bath, heated to a temperature of 225° C. under 72 mm. vacuum to obtain 370 g. of dark reddish brown viscous oil. Analysis indicated that the ratio of fatty acid to rosin in this oil was 2.09.

EXAMPLE 2

Methyl-ethyl ketone-ammonia treatment 100 g. of crude tall oil having a dark brown color was dissolved in 300 cc. of methyl-ethyl ketone at room temperature. To this solution was added 50 cc. of a 20% solution of ammonia in methyl-ethyl ketone. After standing 24 hours, the precipitate was filtered off, washed with acetone and dried. 30 g. of di (methyl-ethyl ketone) amine abietate was recovered. The di (methyl-ethyl ketone) amine abietate was acidified with phosphoric acid in the presence of benzene and the solution water washed and evaporated to obtain 20 g. of resin acid.

EXAMPLE 3

Ethyl-propyl ketone-ammonia treatment 100 g. of crude tall oil having a dark brown color was dissolved in 300 cc. of ethyl-propyl ketone at room temperature. To this solution was added 50 cc. of a 20% solution of ammonia in ethyl-propyl ketone. After standing 24 hours, the precipitate was filtered off, washed with acetone and dried. 30 g. of di (ethyl-propyl ketone) amine abietate was recovered. The di(ethyl-propyl ketone) amine abietate was acidified with phosphoric acid in the presence of benzene and the solution water washed and evaporated to obtain 15 g. of resin acid.

In carrying out the processes of this invention, it will be desirable to first remove any solid matter and water from the tall oil. The tall oil may be treated directly with ammonia and any suitable ketone such as, for example, acetone, whereby fatty and resin acid salts are formed of which the salts of the resin acids precipitate from the mixture. It is preferred to use ammonia and a ketone such as acetone, whereby a complex salt is formed with the resin and fatty acids and whereby the salt of resin acids is insoluble in the ketone such as, for example, the acetone. In this manner, the ketone acts as a solvent as well as taking part in the salt-forming reaction. Other suitable compounds which operate in the manner set forth for acetone are methyl-ethyl ketone, ethyl-propyl ketone, methyl-propyl ketone, diethyl ketone, etc.

The crude tall oil may be treated with acetone and ammonia at a temperature of from about $-10°$ C. to about $100°$ C. and preferably at a temperature of about $0°$ C. to about $50°$ C. The concentration of tall oil in acetone or other suitable compound may vary from about 10% to about 70% and is preferably from about 20% to about 50%. The ratio of ammonia to tall oil may vary widely depending upon the fatty and resin acid content of the tall oil. The ammonia may be used in either the gaseous or liquid form. It is preferable, however, to treat this solution with gaseous ammonia until from 2% to about 15% by weight of the ammonia gas is absorbed by the tall oil mixture. A rapid stream of ammonia gas may be passed into the container of tall oil just above the surface of solution during vigorous agitation. During this ammonia treating operation, the tall oil mixture may be preferably cooled to hold the temperature down to $40-45°$ C. Agitation and treatment of the tall oil mixture with ammonia may be applied from 0.5 hours to 10 hours and is preferably treated for a period of time of from 1 hour to 3 hours.

The acetone and ammonia treated solution of tall oil may be allowed to stand preferably at a temperature of about $0°$ C. to about $30°$ C. for several hours, employing agitation which will cause precipitation of the resinate. The treated tall oil mixture may then be treated in any suitable manner as by filtration to separate the precipitated resinate from the acetone solution of the fatty acid salt.

The acetone solution of concentrated ammonium salts of the fatty acids may then be evaporated for removal of the acetone solvent. The recovered ammonium salts may be used as such or they may be heated to a temperature of about $100°$ C. to about $250°$ C. to decompose the ammonium salts leaving the free fatty acids as residue. Or, if desired, the ammonium salts of the fatty acids may be dissolved in water and acidified to precipitate the fatty acids per se.

Resin acids may be recovered from the precipitated diacetone amine abietate by heating at a temperature from about $100°$ C. to about $300°$ C. during which ammonia, acetone and mesityl oxide are evolved.

The separation of the resin acids from the tall oil may be more completely effected when the tall oil is subjected to isomerization conditions such as to increase the abietic acid content prior to treatment in accordance with this invention. Isomerization of the resin acids present, other than abietic acid, will improve the yield of diacetone-amine salt obtained from the tall oil. Isomerization may be accomplished by heating the tall oil with any suitable inorganic or organic acid as, for example, acidic acid, p-toluene sulfonic acid, hydrochloric acid, sulfuric acid, etc.

It is apparent from the foregoing description that the present invention provides a novel method of separating the fatty and resin acid constituents of tall oil by means of a precipitation process whereby tall oil is subjected to a salt-forming operation in which the ketone acts as a solvent as well as a salt-forming agent and whereby the salt derivative of the resin acid precipitates from the tall oil mixture whereupon separation of the resin and fatty acid salts may be readily accomplished.

What I claim and desire to protect by Letters Patent is:

1. In the method of separating the fatty and resin acid components of tall oil the step which comprises treating an acetone solution of tall oil with ammonia at a temperature between about $-10°$ C. and about $100°$ C. until reaction with said resin acid component is at least partially complete.

2. In the method of separating the fatty and resin acid components of tall oil the step which comprises treating tall oil dissolved in an aliphatic ketone having a labile hydrogen next to the carbonyl group with ammonia at a temperature between about $-10°$ C. and about $100°$ C. until reaction with said resin acid component is at least partially complete.

3. In the method of separating the fatty and resin acid components of tall oil the step which comprises treating a methyl ethyl ketone solution of tall oil with ammonia at a temperature between about $-10°$ C. and about $100°$ C. until reaction with said resin acid component is at least partially complete.

EMIL OTT.